BAND FILTER OF THE N-PATH TYPE

Sept. 1, 1970 W. HEINLEIN ETAL 3,526,858

BAND FILTER OF THE N-PATH TYPE

Filed March 21, 1968 4 Sheets-Sheet 2

United States Patent Office 3,526,858
Patented Sept. 1, 1970

3,526,858

BAND FILTER OF THE N-PATH TYPE

Walter Heinlein, Erik Langer, and Karl-Heinz Mohrmann, Munich, Germany, assignors to Siemens Aktiengesellschaft, Berlin, Germany, a corporation of Germany Filed Mar. 21, 1968, Ser. No. 714,884
Claims priority, application Germany, Mar. 22, 1967, 1,541,971
Int. Cl. H03f *21/00;* H03h *7/10, 7/14*
U.S. Cl. 333—70 10 Claims

ABSTRACT OF THE DISCLOSURE

An N-path type filter is composed of a chain network of four-pole circuits of which each has a series resistor in its longitudinal branch and is terminated by a transversely connected capacitor in series with a switch which closes and opens cyclically in accordance with a keying frequency. An isolating amplifier is interposed between each two four-pole circuits of the chain network. The mutually corresponding switches in the different four-pole circuits open and close in synchronism with each other.

Our invention relates to band filters of the N-path type. Such filters are constituted by a chain network of two or more four-pole circuits of which each contains a series resistor in its longitudinal branch and is terminated by a transversely connected capacitor in series with a switch, all of the capacitors having the same capacitance and the switches being closed and opened cyclically and sequentially in accordance with a keying frequency.

The basic circuit diagram of an N-path filter, represented in FIG. 1 of the accompanying drawing, is known, for example, from a paper "An Alternative Approach to the Realization of Network Transfer Functions: The N-Path Filter", published in the periodical "The Bell System Technical Journal", September 1960, pages 1321 to 1350. Such an N-path filter consists of a longitudinal resistor R and the transverse capacitors C as well as the switches $S_1$, $S_2$ and $S_3$ each connected in series with the respective transverse capacitors. The band filter is illustrated as a four-pole, to whose pair of input terminals the original transmitter voltage source U1 is connected and whose pair of output terminals is terminated by the load resistance $R_L$. Consequently, the filter constitutes an electrical four-pole in form of a branched network in which a longitudinal branch extends all the way through and is connected to ground.

The functioning of the N-path filter shown in FIG. 1 can be explained as follows. The switches $S_1$, $S_2$ and $S_3$ are sequentially closed and opened cyclically at the keying frequency $f_T$. The signal generator issues a voltage of the signal frequency $f_S$. The signal frequency $f_S$ is generally in the neighborhood of the keying frequency $f_T$.

This is schematically illustrated in FIG. 2. The signal of the frequency $f_S$ enters into the four-pole and is modulated by the action of the switches $S_1$, $S_2$, $S_3$ operated at the keying frequency $f_T$. This results in difference frequencies $|f_T-f_S|$ and sum frequencies $f_T+f_S$. There also occur sum and difference frequencies of the type $n \cdot f_T \pm f_S$ ($n$=integer, positive). The combination frequencies resulting therefrom cannot, as a rule, pass through the equivalent low pass which is formed by the longitudinal resistance R1 and the N transverse capacitances C (N is the number of the paths; $N=3$ in the embodiment of FIG. 1), this equivalent low pass having a sufficiently low limit frequency $$f_g = \frac{1}{2\pi \cdot R_1 \cdot NC}$$

Only the difference frequencies $|f_T-f_S|$ which are below the limit frequency $$f_g = \frac{1}{2\pi \cdot R_1 \cdot NC}$$

of the equivalent RC low pass members can pass through the low passes because the signal frequency $f_S$ is sufficiently close to the keying frequency $f_T$. The difference frequency $|f_T-f_S|$ which passes through the equivalent low pass is again modulated by the switches operating at the keying frequency $f_T$, so that there again occur sum and difference frequencies between the keying frequency $f_T$ and the low difference frequency $|f_T-f_S|$. This modulation process again produces the original signal frequency $f_S$ and also the so-called mirror frequency $f_{SP}=2f_T-f_S$. The signal-frequency components of this mixing operation, stemming from the performance of the three switches, become added to one another at the output so as to form a signal-frequency voltage. However, the phase position of the mirror-frequency mixing products stemming from the operation of the three switches is such that at the output no mirror-frequency voltage will occur. That is, the voltage of the mirror frequencies is extinguished by compensation. In practice, the mixing products of higher order which become grouped at the output around the upper harmonics $n \cdot f_T$ of the keying frequency, are filtered out by connecting behind the N-path filter a bandpass filter of relative low selectivity.

The performance, therefore, can be described in accordance with FIG. 2 by stating that the characteristic of the equivalent low pass in the vicinity of the frequency $f=0$ is shifted toward the higher frequencies of the switch keying frequency $f_T$, because frequencies $f_S>f_T$ as well as frequencies $f_S<f_T$ can pass through the filter as long as $|f_T-f_S|$ is sufficiently small. The arrangement thus operates as a bandpass having twice the bandwidth of the equivalent low pass formed of $R_1$ and $N \cdot C$.

A derivation of the equation for the limit frequency of the equivalent low pass is available, for example, in the paper "RC Digital Filters for Microcircuit Bandpass Amplifiers" in the periodical "Electronic Equipment Engineering", March 1964, pages 45 to 49 and page 108. Since a corresponding choice of the magnitudes for $R_1$ and C readily permits the realization of RC low-pass filters of a new Hz. bandwidths, the manner described also affords producing band filters of very slight bandwidth and hence high quality. The median frequency of these bandpass filters is determined by the keying frequency $f_T$ of the switches and does not depend upon the elementary circuits of the filter.

These known filters, however, have the disadvantage that the blocking-flank slope of the damping curve increases only by 6 db per octave. For eliminating these difficulties it has become known from the periodical "Nachrichtentechnik," volume 15, 1965, No. 8, pages 323 to 327, to modify the width and shape of the conductivity curve for exacting requirements by connecting several simple N-path filters in chain reaction. The principle of such a chain connection is illustrated in FIG. 3.

According to FIG. 3, the filter composed of the components $R_1$, $C_1$ and the switches $S_1$ to $S_3$ is followed by another filter composed of the circuit components $R_2$ in the longitudinal branch and the capacitors $C_2$ connected in respective transverse branches in series with respective switches $S_1'$ to $S_3'$. The input voltage is denoted by $U_1$ and the output voltage by $U_2$. This known chain connection of an N-path filter has the disadvantage that the course of the damping function "*a*" plotted over the frequency above and below the band middle frequency increases relatively slowly with increasing distance from the middle frequency and thus gradually merges with the blocking range. Schematically shown in FIG. 4 is the course of the damping function "$a$" in dependence upon the logarithmically indicated frequency $\omega$ of the equivalent low pass. It is a characteristic feature that in this logarithmic representation the damping function $a$, with increasing frequency $\omega$ between the two known pole frequencies $\omega_1$ and $\omega_2$ exhibits an increase of approximately 6 db per octave and converts to an increase of 12 db per octave only at frequencies larger than the characteristic frequency $\omega_2$. The characteristic frequencies $\omega_1$ and $\omega_2$ are the pole frequencies of the transfer function of the equivalent low pass; that is, at these frequencies the complex transfer function of the equivalent low pass has its infinity positions. Due to the mutual influence of the two N-path four-pole members directly chain-connected with each other, it is not possible, although desirable, to provide for coincidence between the two pole frequencies $\omega_1$ and $\omega_2$ of the transfer function of the equivalent low pass resulting from the chain connection of two individual members. This impossibility is due to the fact that, in the event of such coincidence, the course of the damping of the equivalent low pass plotted over the frequency would very rapidly attain the gradient of 12 db per octave directly adjacent to the conductance region. In other words, the transfer from the conducting region to the blocking region would be more abrupt than desirable in most cases of application.

With a chain connection of N-path filters, the expenditure in components generally required for the phase-correct control of the required switches, increases in accordance with the number of chain-connected filter components. In practice, it is desirable to minimize this amount of components as much as feasible.

It is an object of my invention to devise an N-path bandpass filter which, on the one hand, permits obtaining relatively sharp transitions of the damping curve from the pass band to the blocking region and, on the other hand, also affords minimizing the amount of equipment needed for controlling the switches of the individual filter members.

To this end, our invention is predicated upon a band filter of the N-path type which is composed of the chain connection of two or more four-pole circuits, each containing a series resistance in the longitudinal branch and each being followed by a capacitance connected transversely of the chain in series with a switch, the capacitances being substantially equal in magnitude and the swtiches being closed and opened sequentially and cyclically in accordance with a keying frequency. Referring to such a filter, and in accordance with a feature of our invention, we provide between the individual four-pole circuits of the chain network an isolating or separating amplifier and have the mutually corresponding switches in the respective four-pole circuits controlled in synchronism with each other.

According to another feature of the invention, it is preferable with such a chain filter that the accessory low-pass or bandpass circuits required for a definite and unambiguous frequency region of conductivity are arranged only at the input and at the output of the chain network.

A particularly abrupt transfer from passing to blocking region can be achieved in a simple manner by providing for equality of the respective time constants of the different four-pole members, each of these time constants being determined by the product of the longitudinal-branch resistance times the capacitance in one of the N transverse branches.

The damping in the pass frequency region becomes relatively slight if the decoupling or separating amplifiers have a very high input impedance relative to the longitudinal resistance of the preceding four-pole circuit, or if the load impedance is very high relative to the longitudinal resistance of the last four-pole circuit.

Mirror frequencies and carrier remainders in the band middle can be avoided simply by supplementing the individual capacitors by an inductivity so as to form a parallel-resonance tank circuit.

In order to filter the desired bandpass region out of the many pass regions obtained, and securing this selection with the aid of a simple bandpass having a relatively slight selectivity, it is desirable that the resonant frequency of the parallel-resonant tank circuits be lower than one-half the keying frequency of the switches.

According to another feature of our invention, the tank circuits may be given a single-pole connection directly with the longitudinal resistance, or the switches may be single-pole connected directly with the longitudinal resistance.

The damping curve of the filter can be modified in a relatively simple manner by giving the oscillatory circuits in the mutually equal four-poles the same resonant frequency which, however, is to be different from the resonant frequencies of the oscillatory circuits in the other four-poles.

For use in integrated circuits, it is particularly favorable to have the inductivities constituted by coil-free connections, particularly by gyrators with a capacitive output side.

For avoiding ambiguity of N-path filters, it is necessary to provide respective low passes or bandpasses at the input as well as at the output of the N-path chain network, these added passes having a pass range at such frequencies that the second harmonic and all higher harmonics of the keying frequency $f_T$ are suppressed, whereas the useful band around the keying frequency is passed without appreciable distortion. An advantage of a filter according to the invention resides in the fact that such additional low-pass or bandpass connections are not needed for the individual N-path network members but only at the input and output of the entire cascade or chain according to the invention.

In order that the present invention may be readily carried into effect, it will now be described with reference to the accompanying drawings, wherein.

Figure 12:
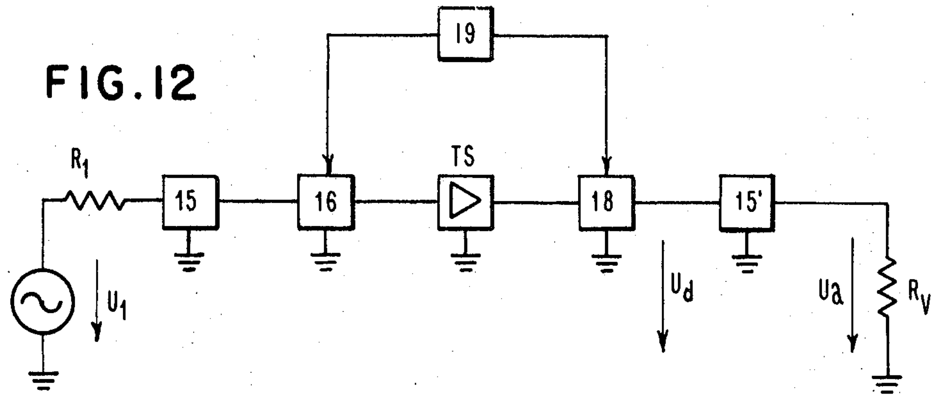
FIG. 12 is a block diagram of an embodiment of the filter of the invention.

A corresponding embodiment according to the invention is illustrated in FIG. 12 by a block diagram. Located at the input of the network is the source of alternating voltage $U_1$. The internal resistance of the source is denoted by $R_1$. The source is followed by a low pass 15, an N-path filter 16, an amplifier TS, a further N-path filter 18, and another low pass 15' followed by the load resistance $R_v$. The two N-path filters 16 and 18 are supplied from a single pulse generator 19 with control-pulse sequences of the keying frequenmy $f_T$. As will be seen from FIG. 12, no further low pass need be provided between the two N-path filters 16 and 18. An amplifier, which as a rule, can be designed as a simple resistance-transistor amplifier, suffices to decouple the two N-path filters from each other. As a rule, the two low passes 15 and 15' are given the same design and their dimensioning is so chosen as to obtain the transfer characteristics illustrated in FIG. 13.

Figure 13:
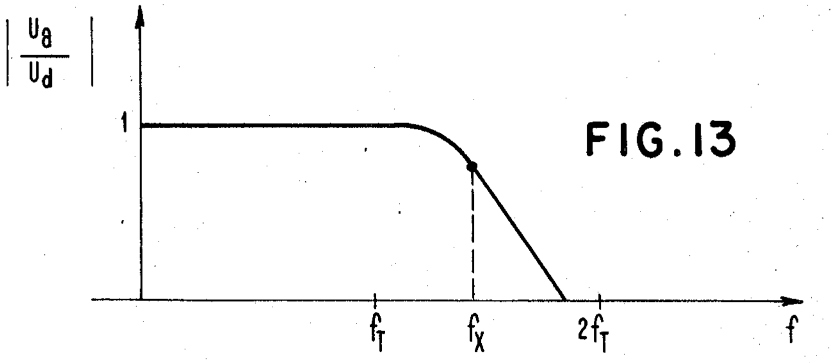
FIG. 13 is a graphical presentation illustrating the relation of the output voltage to the input voltage of a low pass band filter.

FIG. 13 represents the relation of the output voltage $U_a$ to the input voltage $U_d$, for example at the low pass 15', in dependence upon the frequency $f$. The limit frequency $f_x$ of the low pass lies between the frequency $f_T$ and $2f_T$, and hence between the single and double value of the keying frequency supplied from the pulse generator 19. At the double keying frequency $2f_T$, the damping of the low pass should be so high that appreciable output signals can no longer occur in this frequency region.

If the input voltage $U_1$ to be filtered may contain signal frequencies of relatively low magnitude, for example lower than the limit frequencies of the equivalent low passes of the N-path filters 16 and 18, it is advisable to substitute the input low pass 15 by a bandpass whose lower damping flank exhibits a sufficient damping at the limit frequency of the equivalent low passes. The upper limit frequency of this bandpass should be approximately identical with the limit frequency $f_x$ of the low pass 15.

Since, as explained above, the individual N-path filters may be directly chain-connected, the fundamental damping of an individual filter remains preserved on the one hand, and the increase in damping is considerably augmented on the other hand. The interposition of a separating amplifier between the individual members has the advantage that, with a matching choice of the RC time constants of the individual four-poles, a coincidence with respect to the pole localities in the transfer functions of the equivalent low pass can be obtained, whereby an intensive ascent of the damping curve in the transfer region between the pass band and the blocking region can be secured. The use of active circuit components in the separating amplifiers has the advantage that the technical expenditures do not considerably exceed those demanded by a single filter because active circuit components, for example in the form of transistors, can be realized in a relatively simple manner. The synchronous control of mutually corresponding switches has the advantage that the control can be effected with but a single pulse generator.

In the following, the invention will be further described with reference to other embodiments thereof.

Figure 5:
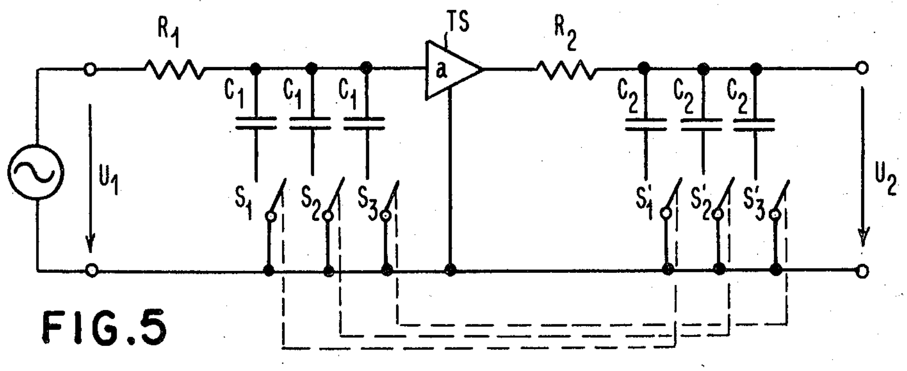
FIG. 5 is a circuit diagram of an embodiment of the filter of the invention.
Figure 7:
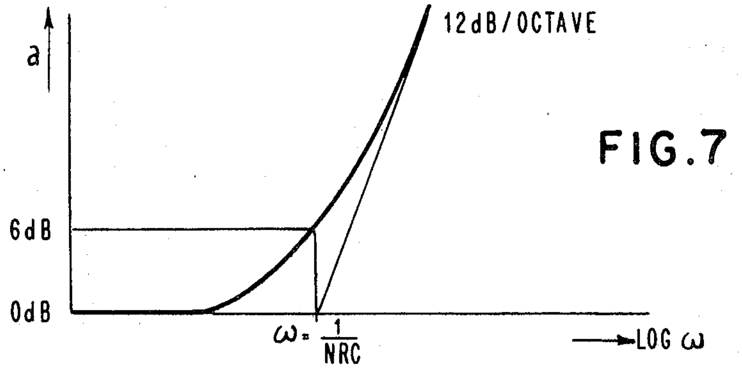
FIG. 7 is a graphical presentation illustrating the damper curve of the filter of the invention, the individual four poles of which have the same time constant.

FIG. 5 shows by way of example an embodiment of the invention by a diagram of the fundamental type. The first N-path band filter consists of a four-pole member whose longitudinal branch contains the resistance $R_1$ and which is followed in the transverse branch by capacitors $C_1$ with respective series-connected switches $S_1$, $S_2$ and $S_3$. The second N-path filter consists of a resistance $R_2$ in the longitudinal branch of the four-pole and capacitors $C_2$ in series with respective switches $S_1'$, $S_2'$ and $S_3'$. In the embodiment here exemplified, the number of paths in the two filters is the same, namely 3. A separating amplifier T is connected between the two filters, its amplification factor (gain) being denoted by $a$. The synchronous control of mutually corresponding switches, for example switches $S_1$ and $S_1'$, is indicated by broken lines. The mutually corresponding switches in respectively different four-poles are closed and opened at the same moments. Applied to the input of the filter is the voltage $U_1$; at the output there appears the voltage $U_2$. The damping of this filter is defined in the known manner by the logarithm of the ratio of voltages $U_1$ and $U_2$. As a rule, a further bandpass is connected to the output terminals in order to filter out any undesired upper harmonic oscillations. If the time constants, determined by the product of $R_1$ times $C_1$, or $R_2$ times $C_2$, of different filters are made equal to each other, a very sharp transition from the pass region to the blocking region of the filter can be obtained and the damping virtually increases already from the limit frequency $\omega_1$ of the equivalent low pass at the slope of 12 db per octave. This steep course of the damping curve is shown in FIG. 7, representing the damping $a$ in dependence upon a logarithmic frequency $\omega$. The frequency $\omega=1/NRC$ entered upon the frequency axis applies in the event $R_1 \cdot C_1 = R_2 \cdot C_2 = RC$. The basic damping of the filter shown in FIG. 5 is equal to the basic damping of an individual filter member if the amplification factor $a=1$.

Figure 6:
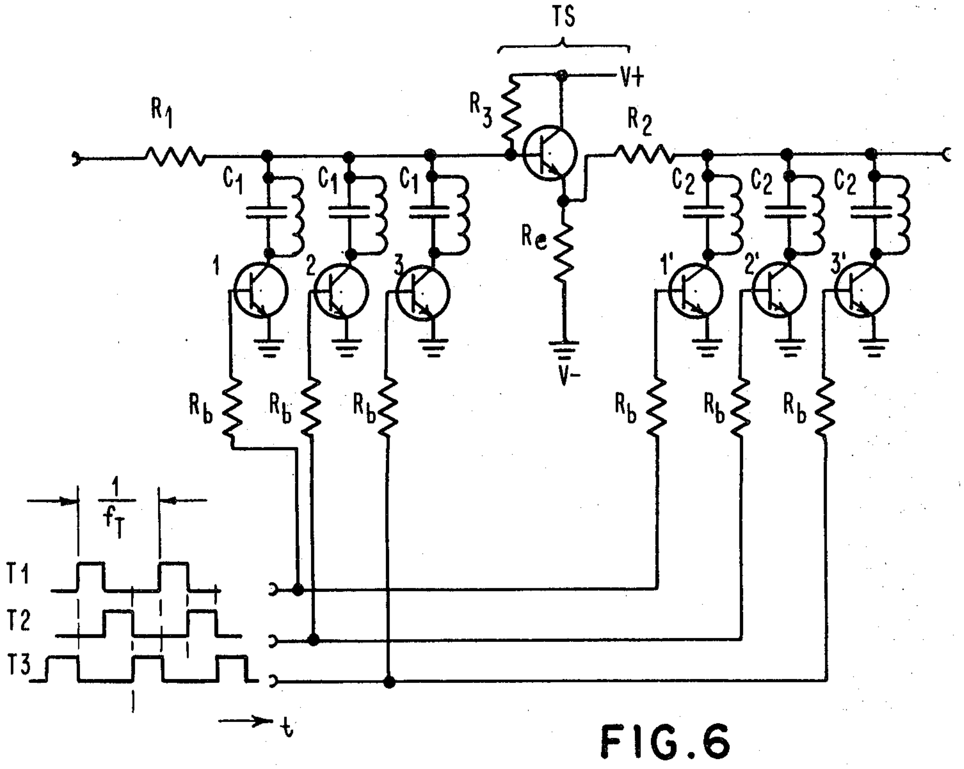
FIG. 6 is a circuit diagram of another embodiment of the filter of the invention.

An embodiment for actual practice, showing the details of the switches, is illustrated in FIG. 6. The first bandpass filter is constituted by the series resistance $R_1$ and the following transverse branches constituted by the capacitances $C_1$ with series-connected respective switching transistors 1, 2, 3. The second bandpass filter consists of the series resistance $R_2$ and the subsequent transverse branches consisting of the capacitances $C_2$ and the respective switching transistors 1', 2' and 3'. The circuit components $R_1$ and $C_1$ may have the same design as the components $R_2$ and $C_2$, but the individual band filters may also differ from each other. The two band filters, which are connected in cascade according to FIG. 5, are decoupled or isolated by a separating stage TS acting as an impedance transformer. The separating stage TS, for example and as indicated in FIG. 6, is formed by a transistor Q operating in emitter follower connection. The collector connection of the transistor Q is attached to a battery voltage source whose potential V+ may be 12 volts for example. A preferably purely ohmic impedance $R_e$ is connected in the emitter line. The emitter line of the transistor Q receives its operating current through the emitter resistor $R_e$ from a source of operating voltage having the potential V—. The preferably ohmic impedance $R_3$ may serve, for example, to adjust the base potential and is connected to the operating voltage source V+. Generally, the separating stage TS should have a sufficiently high ohmic input resistance and a sufficiently low output resistance so that the first band filter is not unduly loaded by the separating stage and the second band filter is operated substantially from a source of constant voltage so that the properties of the second band filter are determined only by $R_2$ but not by the output resistance of the separating stage TS.

The switches in the transverse branches of the two bandpass filter portions of the cascade chain network according to FIG. 6, these switches being constituted by the transistors 1, 2, 3 and 1', 2', 3', are controlled by the pulse sequences T1, T2 and T3. Mutually corresponding switches of the two band filter portions, for example the transistors 1 and 1', the transistors 2 and 2', the transistors 3 and 3', are actuated conjointly in synchronism with each other in response to the same keying pulse. This kind of synchronous operation of the switches in the two band filter portions of the cascade network according to FIG. 6 permits effecting the control with the aid of a single pulse generator which issues the three pulse sequences T1, T2 and T3 with 120 degree displacement from each other. The cycle duration of the individual pulse sequences is $1/f_T$. Attention need be given only to having mutually corresponding switches (for example 1 and 1') in one transverse branch of the respective band filter portions closed and opened simultaneously, whereby undesired recharging phenomena between adjacent capacitances or adjacent oscillatory circuits in the transverse branches of a band filter portion are avoided. The resistances $R_b$ shown in the network according to FIG. 6 and connected ahead of the bases of the switching transistors, are intended to minimize the influence of any nonuniformities of the base-emitter voltages of the individual switching transistors.

The electrical performance of the band filter according to FIG. 6 is as follows. By having the cascade chain connection extend through an impedance transformer, here constituting a separating stage TS, the transfer function of the equivalent low passes of the two bandpass members composing the cascade network according to FIG. 6 are made independent of each other. Consequently, the transfer function of the entire equivalent low pass is determined by the mathematical product of the transfer functions of the individual low pass members. This product formation has the consequence that the slope steepness of the blocking flank formed by the damping curve in the resulting band filter, measured in decibel per octave frequency spacing from the middle of the band filter, is twice as large as the flank slope (steepness) of an individual band filter member. This rule applies to frequencies sufficiently spaced from the band middle frequency of the filter.

However, with this design of an N-pass band filter, difficulties may still be encountered in practice inasmuch as ideal switching elements are not available. This is because the need for sufficient switching speed makes it necessary to give the switches $S_1$, $S_2$, $S_3$, $S_1'$, $S_2'$ and $S_3'$ an electronic design. However, electronic switches, for example switched transistors, have the property that inevitable capacitances, for example the collector-base capacitance of transistors, will cause the keying frequency to become capacitively coupled into the signal channel so that at the output of this band filter, in the band middle and at the switching frequency (keying frequency) $f_T$, there occurs a spurious signal which is located within the signal band to be transmitted and consequently entails an appreciable reduction in transmission quality. Another disadvantage of this network may result from the fact that in practice the capacitances and the switches (in the example of FIG. 6, there are N-3 switches and an equal number of capacitances in each four-pole) cannot be made sufficiently symmetrical, and that the control of the three switches, which is to be effected in the rhythm of the keying frequency $f_T$ with 120° displacement, cannot be executed at a sufficient phase accuracy. In this case, the voltage of the mirror frequency will not be compensated sufficiently strongly at the outptut of the band filter, so that a finite mirror-frequency voltage will occur. This mirror-frequency voltage has a frequency within the pass range of the band filter where it has a particularly disturbing effect.

Figures 8, 9:
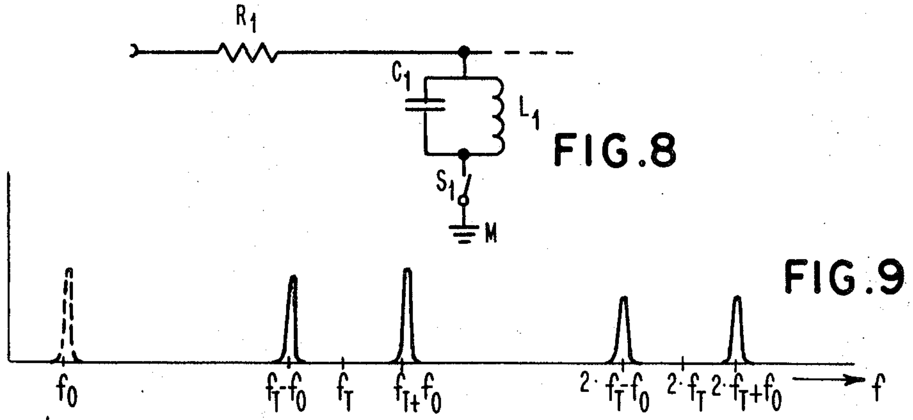
FIG. 8 is a circuit diagram of part of the filter of the invention, having a parallel resonant circuit.
FIG. 9 is a graphical presentation illustrating the frequency distribution of a filter of the type of FIG. 8.

To avoid such trouble, it is advisable to supplement the individual capacitors of the respective filters by an inductivity so as to form a parallel resonance (tank) circuit. A corresponding embodiment is shown by way of example in FIG 8, representing only one path of a component filter. The broken line in the longitudial brach will indicate that this individual member is followed at the right by further members so that a complete N-path filter comes about. In the example of FIG. 8, the switch $S_1$ follows upon the tank circuti $C_1$, $L_1$ and has one pole connected to ground (mass) M. It is essential that inductivities L are connected in parallel to the capacitances C and supplement the capacitances so as to form respective oscillating circuits. The resonance frequencies $f_0$ of these tank circuits should be lower than one-half the keying frequency $f_T$ so that undesired adjacent pass ranges can readily be filtered out by means of a following bandpass filter of relatively slight selectivity.

The performance of a filter network according to FIG. 1, in which the capacitors are supplemented by circuits as shown in FIG. 8 to form parallel-resonance circuits, in as follows. The input signal of the frequency $f_s$ is reduced by modulation with the switch keying frequency $f_T$; that s, there results the difference frequency $f_S-f_T$, or $f_T-f_S$, depending upon whether the signal frequency $f_S$ is higher or lower than the keying frequency $f_T$. The resulting difference frequencies pass through the equivalent bandpass constituted by the tank circuit $L_1$, $C_1$ and the resistance $N \cdot R_1$. The band middle frequency of this equivalent bandpass is $f_0$ when the signal frequency $f_S$ is in the vicinity of the frequencies $f_T \pm f_0$. The same applies when the signal frequency $f_S$ in in the vicinity of the sidebands of the harmonics of the keying frequency $nf_T \pm f_0$. For that reason, an N-path band filter according to FIGS. 1 and 8 exhibits a multiplicity of pass bands which are located symmetrically above and below the harmonics $f_T$, $2f_T$, $3f_T$ and so forth of the keying frequency, and which are spaced from these harmonic frequencies a distance corresponding to the renonance frequency $f_0$ of the tank circuits.

This frequency division is schematically illustrated in FIG. 9. Shown by broken lines is the pass range of the band filter composed of the tank circuit $L_1$, $C_1$ and the resistance $N \cdot R_1$; the corresponding middle frequency is denoted by $f_0$. As a rule, only a single pass region is of interest in practice, for example the pass band located in FIG. 9 at the frequency $f_T+f_0$. For that reason, a further bandpass of relatively slight selectivity is preferately connected to the output of the N-path band filter, so that the undesired pass regions of the band filter are suppressed. This auxiliary bandpass of relatively slight selectivity also suppresses sufficiently the disturbing undesired remainders of the keying frequency $f_T$ and any of its upper harmonic waves as may have penetrated through capacitive coupling into the signal channel. The auxiliary bandpass further suppresses the mirror frequencies which fall into the pass ranges of the band filter. In this manner, it is made certain that the desired pass range of the N-path band filter is free of spurious voltages whose frequencies are situated within the desired pass band.

Several such N-path bandpasses in which the individual capacitances are supplemented by parallel connected inductivities so as to form parallel-resonance circuits, can likewise be connected in chain relation according to FIG. 5. The complete filter then consists of several, for example two, component filters in which the capacitors $C_1$ are supplemental by parallel connected inductivities $L_1$, and the capacitors $C_2$ by parallel connected inductivities $L_2$ according to FIG. 8 to form tank circuits. The middle frequencies of the individual equivalent bandpasses, these frequencies being determined by $N \cdot R_1$, $C_1$ and $L_1$ or $N \cdot R_2$, $L_2$ and $C_2$ may be equal to or different from each other. By virtue of the fact that the cascade connection extends through the separating stage TS in the same manner as in the filter according to FIG. 5, the transfer functions of the equivalent bandpasses of the individual component filters according to FIG. 8 which compose the cascade network are independent of each other. This has the result that the transfer function of the entire equivalent bandpass, which determines the filtering characteristics of the resulting N-path band filter, is defined by the mathematical product of the transfer functions of the individual equivalent bandpass filters.

In practice, it may be advantageous to have the tank circuits single pole connected to ground (mass) as is partially shown in FIG. 8. This is advisable particularly if, in order to enable a design according to integrated circuit techniques, the inductivity L of the tank circuits is to be realized by coil-free circuitry, since the inductivity then can be realized technically in a particularly simple manner with the aid of gyrator circuits known as such. In this case, the switches $S_1$, $S_2$ and $S_3$ of the first component filter according to FIG. 5 are to be single-pole connected directly to the longitudinal resistance $R_1$ of the left band-filter four-pole member. Likewise, the switches $S_1'$, $S_2'$ and $S_3'$ of the second component filter in FIG. 5 are to be single-pole connected directly to the longitudinal resistance $R_2$ of the right-hand filter four-pole. In this case, therefore, nongrounded designs on both sides of the switches $S_1$, $S_2$, $S_3$, $S_1'$, $S_2'$, $S_3'$ are needed. Such a bilaterally ground-free electronic switch may be constructed, for example, by a field-effect transistor FET.

Figure 10:
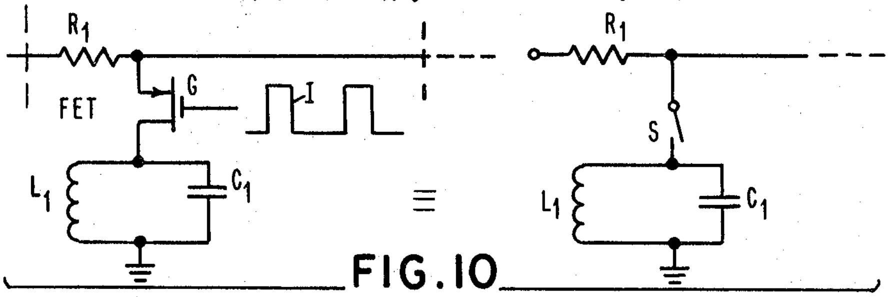
FIG. 10 is a circuit diagram and an equivalent circuit diagram of part of a filter in which one pole of the switch is connected to the resistor.

An embodiment in which the switches are single-pole connected with the longitudinal resistance is represented in FIG. 10. The electronic switches are actuated by voltage pulses I supplied to the control electrode (gate) G. The transverse branch of the band filter four-pole, consisting of the field-effect transistor FET and the resonant oscillatory circuit $L_1$, $C_1$ is thus identical with a transverse branch formed of the switch S and the tank circuit $L_1$, $C_1$, as is expressed by the electrical substitute diagram, likewise shown in FIG. 10.

Figure 1:
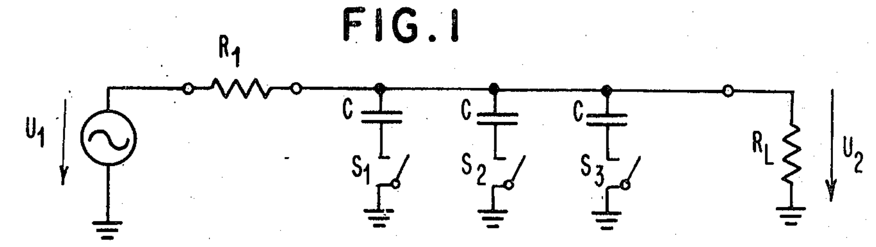
FIG. 1 is a circuit diagram of a known filter of N-path type.
Figure 2:
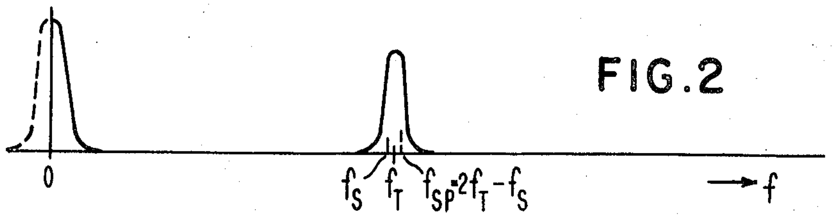
FIG. 2 is a graphical presentation illustrating the signal and keying frequency appearing in FIG. 1.
Figure 3:
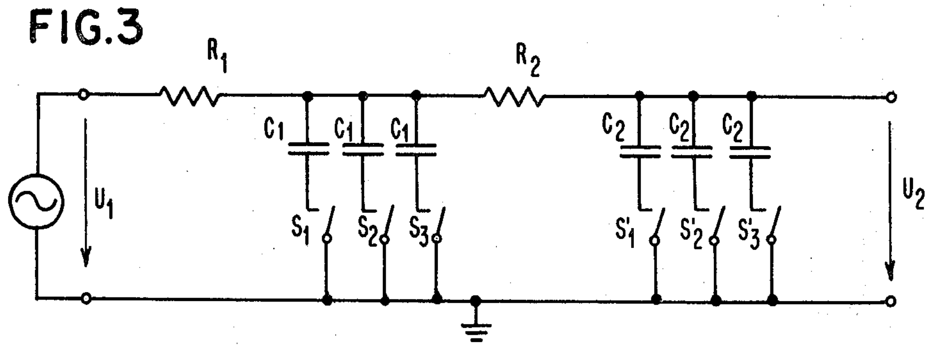
FIG. 3 is a circuit diagram of a tandem connection of a plurality of filters of the type of FIG. 1.
Figure 4:
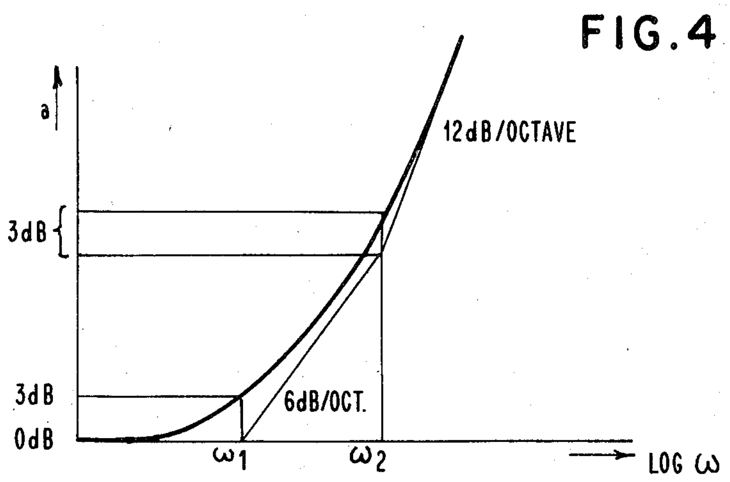
FIG. 4 is a graphical presentation illustrating the damper curve of the filter of FIG. 1.

If the resonance frequencies and bandwidths of the tank circuits $L_1$, $C_1$ and the tank circuits $L_2$, $C_2$ of the band filter according to FIGS. 5 and 8 are equal to each other, there will result a band filter whose flank slope of the damping curve, plotted versus frequency, will ascend more steeply than with a network according to FIGS. 1 and 8. Departures of the resonance frequencies of the tank circuits in the second filter member from the resonance frequencies of the tank circuits in the first band filter member, may be utilized for the purpose of modifying the curve of the damping in the pass band of the resulting band filter so as to obtain a prescribed waviness in a manner comparable to a Tschebyscheff filter.

Figure 11:
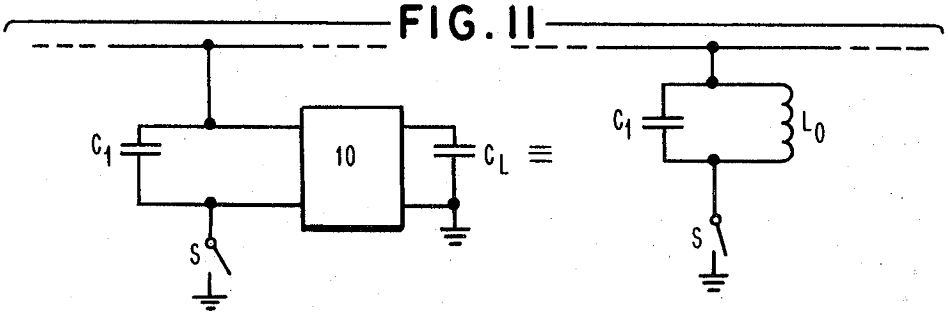
FIG. 11 is a circuit diagram and an equivalent circuit diagram of part of a filter comprising a gyrator, in accordance with the filter of FIG. 8.

In practice, it is usually desirable to design the N-path filter in such a manner that the inductivities $L_1$ and $L_2$ required for the tank circuits, are formed by coil-free and generally active circuit components. One of the ways available for this purpose is to imitate an inductivity by the inductive input resistance of a gyrator G loaded by a capacitance C. This is schematically represented in FIG. 11 showing a portion of the transverse branch of a band filter according to FIG. 8, but modified by having the inductivity constituted by a gyrator 10 loaded on the output side by the capacitance $C_L$. FIG. 11 also shows the corresponding equivalent circuit diagram constituted by a tank circuit, a capacitance $C_1$ and an inductivity $L_0$. The index "0" at the inductivity L is intended to represent that this inductivity is realized without use of a coil. Gyrator circuits 10 satisfy this purpose and consisting for example only of transistors and resistors are known as such.

We claim:

1. A band pass filter of N-path type comprising a plurality of four pole circuits connected in tandem, each of said four pole circuits having an input, an output, a first branch directly connecting the input to the output, a second branch connected between said input and said output, an ohmic resistor connected in series in said second branch, a plurality of cross-branches connected between said first and second branches between said resistor and said output, each of said cross-branches comprising a capacitor and a switch connected in series circuit arrangement, each of said capacitors having the same capacitance, the switches of each of said four pole circuits having closing intervals which follow each other in cycles, the corresponding switches of the four pole circuits having synchronous closing intervals, and a pair of auxiliary filters for the selection of only one of the pass bands of said band pass filter, each of said auxiliary filters being connected to a corresponding one of said input and said output; and a plurality of isolating amplifiers each connecting and connected between a corresponding pair of next-adjacent four pole circuits.

2. In a band filter according to claim 1, different ones of said four-pole circuits of the chain network having the same time constants, determined by the product of resistance in the longitudinal branch times capacitance in one of the N-transverse branches.

3. In a band filter according to claim 1, said amplifiers having a high input impedance relative to the longitudinal resistance of the next preceding four-pole circuit.

4. Band filter according to claim 1 comprising a load impedance connected to the output of the chain network and having high impedance relative to the longitudinal resistance of the last preceding four-pole circuit of the network.

5. A band filter according to claim 1 comprising respective inductivities which supplement said capacitors so as to form respective parallel-resonance circuits in said transverse branches of the chain network (FIG. 8).

6. In a band filter according to claim 5, said parallel resonance circuits having a resonance frequency lower than one-half of the keying frequency of said switches.

7. In a band filter according to claim 5, said resonance circuits being single-pole connected directly with the longitudinal resistance.

8. In a band filter according to claim 5, said switches being single-pole connected directly with the longitudinal resistance (FIG. 10).

9. In a band filter according to claim 5, said resonance circuits in mutually corresponding four-pole circuits having resonance frequencies equal to each other and different from the resonance frequencies of the other four-pole circuits.

10. In a band filter according to claim 5, said inductivities being constituted by coil-free circuit devices (FIG. 11).

References Cited

UNITED STATES PATENTS 3,172,043 3/1965 Altman ---------------- 328—55

OTHER REFERENCES

"An Alternative Approach to the Realization of Network Transfer Functions: The N-Path Flter," Franks and Sandberg; The Bell System Technical Journal—September 1960, pp. 1321–1322 and pp. 1334–1346.

ELI LIEBERMAN, Primary Examiner

M. NUSSBAUM, Assistant Examiner

U.S. Cl. X.R.

330—51, 12

PO-1050
(5/69)

UNITED STATES PATENT OFFICE
CERTIFICATE OF CORRECTION

Patent No. 3,526,858 Dated September 1, 1970

Inventor(s) WALTER HEINLEIN, ERIK LANGER and KARL-HEINZ MOHRMANN

It is certified that error appears in the above-identified patent and that said Letters Patent are hereby corrected as shown below:

In the heading, column 1, the German priority number should read as follows:

--P 15 41 971.3--

SIGNED AND
SEALED
DEC 15 1970

(SEAL)
Attest:

Edward M. Fletcher, Jr.
Attesting Officer

WILLIAM E. SCHUYLER, JR.
Commissioner of Patents